Apr. 24, 1923.
G. P. MacINTOSH
1,452,886
SPOKE ENGAGING ANTISKID CHAIN ANCHORING MEANS
Filed Oct. 10, 1921
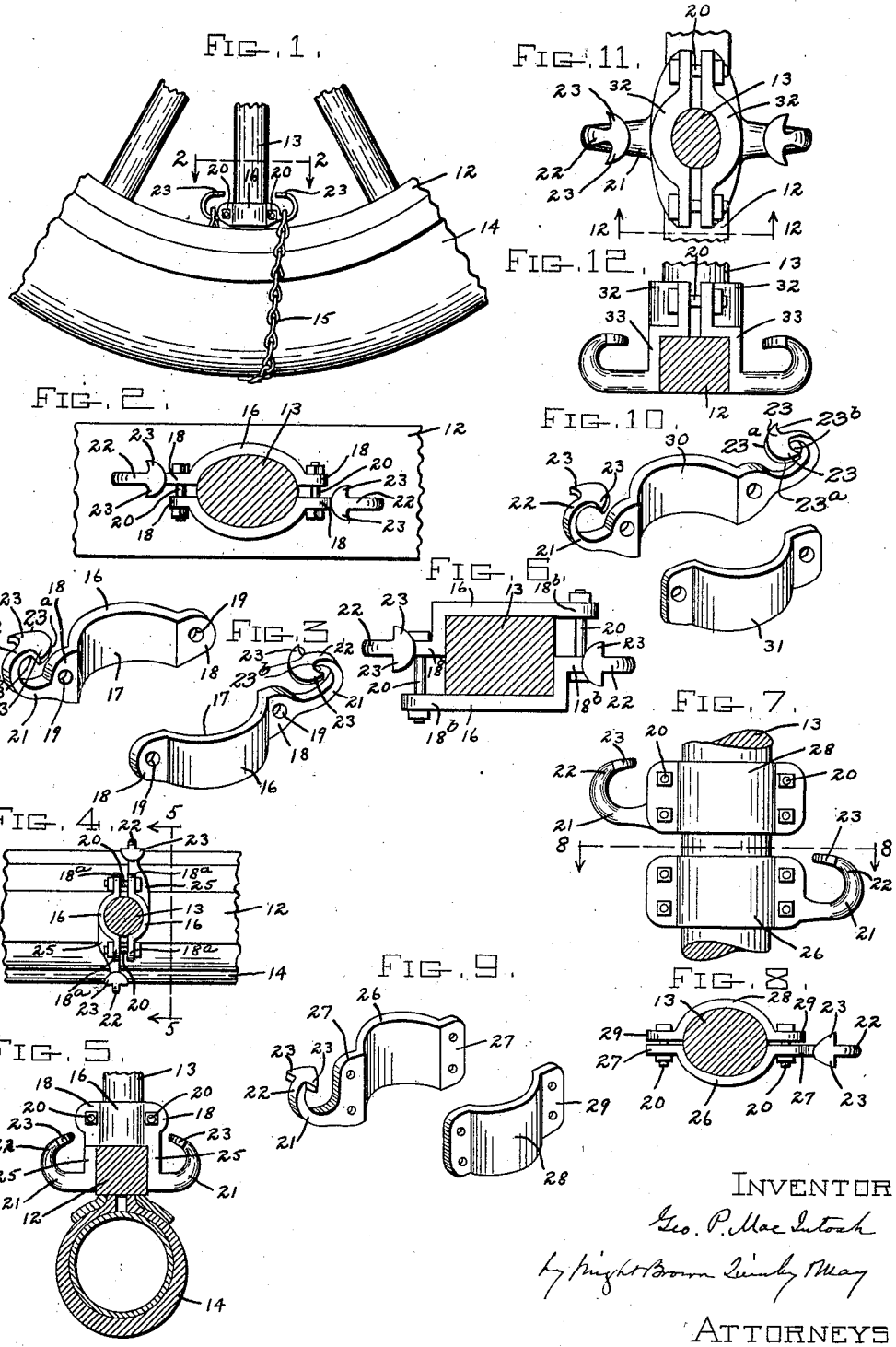

Patented Apr. 24, 1923.

1,452,886

UNITED STATES PATENT OFFICE.

GEORGE P. MacINTOSH, OF WAKEFIELD, MASSACHUSETTS.

SPOKE-ENGAGING ANTISKID-CHAIN-ANCHORING MEANS.

Application filed October 10, 1921. Serial No. 506,586.

*To all whom it may concern:*

Be it known that I, GEORGE P. MACINTOSH, citizen of the United States, residing at Wakefield, in the county of Middlesex and State of Massachusetts, have invented new and useful Improvements in Spoke-Engaging Antiskid - Chain - Anchoring Means, of which the following is a specification.

This invention relates to an anti-skid device, which includes a chain adapted to extend across the tire of a vehicle wheel, and anchoring means attached to a spoke of the wheel and adapted to engage the terminal links of the chain in such manner as to confine the latter in its operative position. The invention is embodied in the improved anchoring means hereinafter described and claimed, adapted to be conveniently and securely attached to a spoke and to confine the chain, in such manner as to permit the convenient application and removal of the chain and prevent its automatic or accidental removal and loss.

Of the accompanying drawings forming a part of this specification,—

Figure 1 is a side elevation of a portion of a vehicle wheel provided with chain-anchoring hooks and securing means therefor embodying the invention.

Figure 2 is a section on line 2—2 of Figure 1, looking toward the wheel felly, the chain tire being omitted.

Figure 3 shows in perspective the hooks and securing means shown by Figures 1 and 2, separated from each other.

Figure 4 is a view similar to Figure 2, showing a different form and arrangement of the securing means.

Figure 5 is a section on line 5—5 of Figure 4.

Figure 6 is a view similar to Figure 2, showing a spoke, which is rectangular in cross section.

Figure 7 is a side view of a portion of a spoke provided with anchoring hooks and securing means composed of two units.

Figure 8 is a section on line 8—8 of Figure 7.

Figure 9 shows in perspective the members of one of the units shown by Figure 7, separated from each other.

Figure 10 shows in perspective another form of hooks and securing means.

Figure 11 is a view similar to Figure 4, showing another form of the hooks and securing means.

Figure 12 is a section on line 12—12 of Figure 11.

The same reference characters indicate the same parts in all of the figures.

Referring first to Figures 1, 2, 3, 4, 5 and 6, 12 represents a wheel felly, 13 a spoke thereof, 14 a tire on the felly, and 15 an anti-skid chain anchored to the spoke 13 and looped across the sides of the felly and the tread face of the tire. The terminal links of the chain are engaged with guarded hooks, secured to the spoke by securing means associated with the hooks. The said securing means in this embodiment of the invention, comprises a pair of duplicate clamping jaws 16 having opposed inner faces 17 (Figure 3) formed to bear on opposite sides of the spoke 13, ears at opposite ends of the faces 17 having bolt holes 19, and clamping bolts 20 engaged with said ears and adapted to confine the jaws on the spoke. Said ears are designated by 18 in Figures 2 and 3, by 18$^a$ in Figure 4, and by 18$^b$ in Figure 6.

Each jaw is provided with a guarded hook composed of a curved neck portion 21, projecting from one side of the spoke, a terminal portion 22, overhanging the base of the neck portion, and flukes 23, projecting in opposite directions from the plane of the neck portion. The hooks project from opposite sides of the spoke. Each fluke has outer link-guiding edge portions 23$^a$ (Figs. 3 and 10) collectively forming a substantially semicircular edge and shoulder forming inner edges 23$^b$. The flukes constitute substantially semicircular heads of greater width than the thickness of the neck portions 21 and projecting outward in opposite directions from the opposite sides of said neck portions. Each head is formed to permit the passage of a terminal link across the head when the link is held in an abnormal position with its major axis extending substantially at right angles with the major portion of the chain so that the opening of the link is adapted to pass freely over the head. When the link is moved onto the neck portion 21 and is turned to slide onto the neck, the link occupies its normal position relative to the major portion of the chain, and its removal from the hook is prevented by the edges 23$^b$. Each hook is adapted to be engaged with a terminal link of the chain 15 by a suitable manipulation of the link, the latter being first turned to pass over the flukes 23, and then given a quarter turn and transferred to the neck portion 21. The flukes prevent the removal of the link from the hook, excepting by a reversal of the above-described movements of the link, and as this reversal can not take place automatically, there is no liability of the loss of the chain.

The jaws are formed as shown by Figures 2 and 3, when the spoke is elliptical in cross section, and as shown by Figure 6, when the spoke is rectangular in cross section, the clamp being prevented from turning on the spoke by the form of the latter. When the spoke is circular in cross section, as shown by Figure 4, I so form the jaws that portions thereof bear against the sides of the felly 12, as shown by Figure 5, so that the felly prevents the jaws from turning on the spoke. To this end the neck portions 21 of the hooks are offset from the ears 18, and connected with the latter by arms 25, which bear on opposite sides of the felly.

The securing means may be composed of two independent units attached side by side to the spoke 13, as shown by Figure 7. Each unit is composed of a jaw 26, having bolt-engaging ears 27, and a jaw 28, having bolt-engaging ears 29. A guarded hook, constructed as above described, is formed on one of the ears of the jaw 26, the jaw 28 having no hook. The hook of one of the units projects from one side of the spoke, and the hook of the other unit projects from the opposite side, as shown by Figure 7. Each unit comprises a pair of clamping jaws having opposed inner faces formed to bear on opposite sides of a wheel spoke, bolt-engaging ears at opposite ends of said inner faces, and a guarded hook projecting from one end of one of the jaws and formed to be engaged with one of the terminal links of the chain in such manner as to prevent the loss of the chain. The other unit constitutes a suitable embodiment of means for engaging the other terminal link of the chain.

As shown by Figure 10, the securing means may be embodied in a jaw 30, having guarded hooks at its opposite ends, and an opposed hookless jaw 31.

As shown by Figures 11 and 12, the securing means may be composed of two jaws 32, having arms 33, which bear on opposite sides of the felly, the guarded hooks being formed on said arms and offset thereby from the jaws. When the hooks are offset from the jaws, and project from the sides of the felly, as shown by Figures 4, 5, 11 and 12, they are in closer proximity to the tire than in the constructions shown by the other figures, so that shorter chains may be used.

I claim:

The combination with a spoked wheel, an elastic tire and an anti-skid chain adapted to be looped across the sides of the wheel felly and the tread face of the tire; of a pair of guarded hooks, and means securing said hooks to a spoke of the wheel, the hooks projecting from opposite sides of the spoke, each hook including a curved neck portion projecting from one side of the spoke and centrally thereof, a terminal portion overhanging the base of the neck portion, and flukes on the terminal portion projecting in opposite directions from the plane of the neck portion, said flukes having inclined outer link-guiding edges formed to permit the passage of terminal chain links across the said terminal portions and onto the neck portions, when the links are held in abnormal positions, and shoulder-forming inner edges formed to prevent the removal of said links when they are in their normal positions, said neck portions supporting the looped chain in its operative position.

In testimony whereof I have affixed my signature.

GEORGE P. MacINTOSH.